United States Patent [19]
Tsukamoto et al.

[11] Patent Number: 6,063,462
[45] Date of Patent: *May 16, 2000

[54] MULTILAYER FILM

[75] Inventors: Hajime Tsukamoto, Ibaraki-ken; Ichiro Kitada, Kashiwa; Yoshiharu Nishimoto, Iwaki, all of Japan

[73] Assignee: Kureha Kagaku Kogyo Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/688,878

[22] Filed: Jul. 31, 1996

[30] Foreign Application Priority Data

Jul. 31, 1995 [JP] Japan .................................. 7-214190

[51] Int. Cl.$^7$ ..................................................... B32B 7/02
[52] U.S. Cl. ........................ 428/36.7; 428/500; 428/516; 428/910; 428/332; 428/339
[58] Field of Search .................................. 428/36.7, 500, 428/516, 910, 332, 339; 220/415

[56] References Cited

U.S. PATENT DOCUMENTS

| | | |
|---|---|---|
| 5,084,534 | 1/1992 | Welborn, Jr. et al. . |
| 5,183,867 | 2/1993 | Welborn, Jr. . |
| 5,272,236 | 12/1993 | Lai et al. . |
| 5,278,272 | 1/1994 | Lai et al. . |
| 5,360,648 | 11/1994 | Falla et al. . |
| 5,397,613 | 3/1995 | Georgelos . |
| 5,465,788 | 11/1995 | Beckele et al. ........................ 264/469 |
| 5,482,770 | 1/1996 | Beckele et al. ........................ 428/339 |
| 5,707,751 | 1/1998 | Garza et al. ........................... 428/515 |

FOREIGN PATENT DOCUMENTS

| | | |
|---|---|---|
| 676047 | 11/1994 | Australia . |
| 701139 | 1/1995 | Australia . |
| 681116 | 11/1995 | Australia . |
| 0 597 502 | 5/1994 | European Pat. Off. . |
| 0 701 897 | 3/1996 | European Pat. Off. . |
| 0 707 957 | 4/1996 | European Pat. Off. . |
| WO94/09060 | 4/1994 | WIPO . |
| WO95/08441 | 3/1995 | WIPO . |
| WO95/10566 | 4/1995 | WIPO . |
| WO96/12762 | 5/1996 | WIPO . |

*Primary Examiner*—Richard Weisberger
*Attorney, Agent, or Firm*—Wenderoth, Lind & Ponack, L.L.P.

[57] ABSTRACT

A flexible multilayer film suitable as a (food-)packaging material includes a first seal layer comprising principally a metallocene-catalyzed polyolefin, and a second seal layer comprising a copolymer of at least one oxygen-containing monomer and ethylene. The copolymer is set to have a crystal melting point lower than that of the metallocene-catalyzed polyolefin. The second seal layer may preferably have a thickness larger than that of the first seal layer. Because of the provision of the second seal layer adjacent to the first seal layer, the multilayer film is provided with an improved film-formability while retaining the good sealability of the metallocene-catalyzed polyolefin.

12 Claims, No Drawings

MULTILAYER FILM

FIELD OF THE INVENTION AND RELATED ART

The present invention relates to a multilayer film including a seal structure comprising a seal layer and a second seal layer, more specifically a multilayer film including a seal layer comprising principally a polyolefin produced by polymerization in the presence of a metallocene catalyst (hereinafter termed a "metallocene-catalyzed polyolefin"), which is excellent in film-formability, sealability and flexibility.

A metallocene-catalyzed polyolefin is generally excellent in sealability, hot tack and transparency but is liable to be accompanied with poor film-formability or film-processability. Moreover, while depending on the shape or form of a package, a flexible multilayer film formed therefrom is liable to have insufficient sealability, film strength and heat resistance.

Several packaging materials using metallocene-catalyzed polyolefins have been proposed. For example, Japanese Laid-Open Patent Application (JP-A) 6-8383 (Bekele) discloses a cook-in film having an improved seal strength, including: a seal layer comprising a polyamide blend, and a core layer and an outer layer each comprising a metallocene-catalyzed ethylene-butene copolymer, of which at least the seal layer is crosslinked. JP-A 7-1680 (Bekele) discloses a multilayer film showing a low oxygen permeability, including at least one oxygen-barrier layer comprising a blend of a terpolymer of monomers selected from ethylene, an acrylic acid ester, maleic acid and glycidyl methacrylate, and an ethylene-vinyl alcohol copolymer, and also a surface layer comprising a blend of metallocene-catalyzed polyolefin on a non-sealing side. JP-A 59-143639 (Oval) discloses a six-layered shrinkable film including a first layer (seal layer) of, e.g., propylene-ethylene random copolymer or ionomer resin having a higher softening point than a second layer (shrink layer) which has a thickness large enough to govern a shrinking temperature of the entire multilayer film by the shrinking temperature of the second layer and comprises, e.g., ethylene-vinyl acetate copolymer or linear low-density polyethylene of identical thickness, a third layer (adhesive layer) of modified polyethylene, a fourth layer (gas impermeable layer) of hydrolyzed ethylene-vinyl acetate copolymer, a fifth layer (adhesive layer) and a sixth layer (abrasion-resistant layer). JP-A 6-210810 (Lamesh) discloses a back-seamable multilayer film, which is a heat-shrinkable multilayer film including a heat-sealing layer comprising a blend of at least ca. 50 wt. % of a propylene-based copolymer and a homogeneous ethylene-α-olefin copolymer having a density of below ca. 0.90 g/cc. JP-A 6-320685 (Ohmori et al) discloses a polyolefin-based multilayer film having a gas-barrier layer, and polyolefin resin layers including innermost and outermost layers each comprising an ethylene-type copolymer having a molecular weight dispersion factor (weight-average/number-average molecular weight ratio) of below 3 and an intermediate layer of ethylene-methacrylic acid copolymer. The multilayer film may be irradiated with electron rays from the surface layer. JP-A 6-166157 (Yoshii) discloses a multi-layer blown plastic container including a gas barrier layer and a layer of metallocene-catalyzed polyolefin resin having a molecular weight distribution factor of below 2.5.

As described above, a metallocene-catalyzed polyolefin has advantageous properties including excellent sealability, hot tack and transparency but is also accompanied with a difficulty of poor film formability. A major characteristic of a metallocene-catalyzed polyolefin is that it has low melt tension. Further, because of a narrow molecular weight distribution, a sufficient degree of molecular entanglement does not occur in a melting state, so that the metallocene-catalyzed polyolefin is liable to cause melt fracture during film forming or film processing to result in poor film surface properties and cause difficulties, such as unstable bubble formation in the inflation process and low draw resonance, whereby stable film forming or film processing becomes difficult. Regarding the sealability, a metallocene-catalyzed polyolefin can provide a large seal strength when formed in an ideal seal shape but generally shows a narrow seal condition or range, so that it is liable to cause a flow at a seal line and result in a lower strength because of a smaller thickness. The above difficulties may be alleviated to some extent, e.g., by introducing long-chain branches onto a main chain of the metallocene-catalyzed polyolefin, but it is not sufficient in some cases.

As described above, it is difficult to obtain a flexible multilayer film excellent in film formability and sealability only by disposing a seal layer of a metallocene-catalyzed polyolefin, and further improvement is desired.

SUMMARY OF THE INVENTION

Accordingly, a principal object of the present invention is to provide a flexible multilayer film excellent in film formability or film processability and sealability.

According to the present invention, there his provided a multilayer film, including: a first seal layer comprising principally a metallocene-catalyzed polyolefin, and a second seal layer comprising a copolymer of at least one oxygen-containing monomer and ethylene; said copolymer having a crystal melting point lower than that of the metallocene-catalyzed polyolefin.

It is preferred that second seal layer has a thickness larger than that of the first seal layer. In case where any of the first seal layer and the second seal layer comprises a mixture of polymers, the above-mentioned crystal melting point relationship should be satisfied between the polymer species occupying the largest proportions in the first seal layer and the second seal layer respectively. The multilayer film may preferably have a secant modulus at 2.5% strain of 150–450 MPa as a whole.

These and other objects, features and advantages of the present invention will become more apparent upon a consideration of the following description of the preferred embodiments of the present invention.

DETAILED DESCRIPTION OF THE INVENTION

A metallocene catalyst used in production of the metallocene-catalyzed polyolefin in the present invention refers to a catalyst comprising a compound having a structure wherein a transition metal is sandwiched with a pair of unsaturated cyclic compounds, which may have various forms based on different species of metals and ligands, and may be used as polymerization catalysts for olefins, such as ethylene and propylene, and other vinyl monomers, such as styrene, in combination with specific promoters as desired. The metallocene catalysts are also called Kaminsky catalysts, Kaminsky-Sinn catalysts, single-site catalysts, or homogeneous catalysts.

A constrained geometry catalyst is a type of metallocene catalyst developed by Dow Chemical Company. The constrained geometry catalyst may provide ethylene-α-olefin copolymers which may be classified as a substantially linear polyethylene resin having ca. 0.01–ca. 3, preferably ca. 0.1–ca. 1, more preferably ca. 0.05–ca. 1, long-chain branch (es) per 1000 carbon atoms. Because of long-chain branches each having ca. 6 or more carbon atoms selectively introduced into its molecular structure, the ethylene-α-olefin copolymer may be provided with excellent physical properties and good formability or processability, and an example thereof is commercially available from Dow Chemical Company under a trade name of "Affinity" (including 1-octene as α-olefin).

A characteristic of the metallocene catalyst is the homogeneity of active sites, thus resulting in a product polymer having enhanced homogeneity of molecular weight, molecular weight distribution, composition and compositional distribution. For example, a larger comonomer content provides a lower density, a lower melting point, and a film having improved strength and transparency but also lower heat-resistance and film processability. The metallocene-catalyzed polyolefin can contain comonomer units introduced uniformly into the main chain and is relatively free from a problem, such as sticky film formation, thereby providing a bag having a better film openability, compared with a polyolefin formed by using a Ziegler catalyst liable to have a larger comonomer content in a lower molecular weight fraction. It is also known that LLDPE (linear low-density polyethylene) prepared through polymerization using a metallocene catalyst (single-site catalyst) has a lower density than LLDPE prepared through polymerization using a conventional catalyst (multi-site catalyst) at an identical comonomer content (e.g., as described in "Plastic" (in Japanese), Vol. 44, No. 10, page 81, FIG. 17). There is also known a metallocene-catalyzed LLDPE showing a remarkably lower melting point at an increased comonomer content and at an identical density compared with a Ziegler-catalyzed LLDPE("PPS Reports" (in Japanese), No. 53, October, 1994, page 7, FIG. 14). Such metallocene-catalyzed LLDPE is shown to have a single polymer elusion temperature peak as measured by the ATREF (Analytical Temperature Rising Elution Fractionation) method compared with a Ziegler-catalyzed LLDPE showing three polymer elution temperature peaks (ibid., page 2, FIG. 1).

The present invention provides a flexible multilayer film excellent in formability and sealability based on the characteristics of metallocene-catalyzed polyolefin as described above.

The first seal layer constituting the multilayer film of the present invention can provide the multilayer film with excellent formability and sealability based on the characteristics of metallocene-catalyzed polyolefin as described above.

The first seal layer constituting the multilayer film according to the present invention may comprise a hermetically sealable resin layer suitable for constituting, e.g., an innermost layer of an inflated multilayer film. The second seal layer is a resin layer generally disposed adjacent to the first seal layer so as to provide a two-layer seal structure together with the first seal layer, thereby taking advantage of the characteristics of the metallocene-catalyzed polyolefin. More specifically, the metallocene-catalyzed polyolefin constituting the first seal layer exhibits excellent sealability, hot tack and transparency, but shows insufficient extrudability and film-formability, and a single layer thereof cannot readily exhibit a sufficient seal strength because of a narrow range of optimum sealing condition. Thus, the second seal layer should be disposed adjacent to the first seal layer comprising a metallocene-catalyzed polyolefin alone.

The metallocene-catalyzed polyolefin used in the first seal layer may be an ethylene-based resin, a propylene-based resin or a butene-based resin. More specifically, the ethylene-based resin may include copolymers of ethylene in a major proportion (i.e., at least 50 wt. %) and a minor proportion (i.e., at most or less than 50 wt. %) of α-olefins having up to 10 carbon atoms, such as propylene, butene-1, pentene-1, 4-methyl-pentene-1, hexane-1 and octene-1, including those generally called linear low-density polyethylene (LLDPE), linear medium-density polyethylene (LMDPE) and very low-density polyethylene (VLDPE). The propylene-based resin and butene-based resin may include homopolymers of propylene and butene, and copolymers of these monomers with ethylenes and other α-olefins, such as propylene, butene-1, 4-methylpentene-1, hexene-1 and octene-1. A metallocene-catalyzed ethylene-based resin (ethylene-based polyolefin) is particularly preferred because of good sealability, hot tack and transparency.

In order to provide a multilayer film having good film-formability and heat resistance in addition to the sealability, hot tack and transparency, it is preferred to compose the first seal layer of a mixture comprising 90–0 wt. %, more preferably 90–25 wt. %, of a metallocene-catalyzed polyolefin having a crystal melting point of 105–145° C., further preferably 105–125° C., and 10–100 wt. %, more preferably 10–75 wt. %, of a metallocene-catalyzed polyolefin having a crystal melting point of 70–below 105° C., further preferably 86–below 105° C. Particularly, the crystal melting point of one metallocene-catalyzed polyolefin may preferably be at most 100° C. in the case of a heat-shrinkable film.

In the case of providing a packaging film having good heat-resistance and good bag openability, it is preferred to use a metallocene-catalyzed polyolefin having a crystal melting point in the range of from 86° C. to below 105° C. A metallocene-catalyzed polyolefin having a crystal melting point below 86° C. can be used as a portion of the metallocene-catalyzed polyolefin even for such use, but the proportion thereof should preferably be restricted to at most 40 wt. %.

In the case of providing a first seal layer of a mixture resin, the species of metallocene-catalyzed polyolefin occupying the largest proportion should have a crystal melting point higher than that of the (principal) resin (component) constituting the second seal layer so as to ensure a good sealability (i.e., bag-making property).

In the case of heat-shrinkable multilayer film, it is preferred that the first seal layer contains at least 25 wt. % of a metallocene-catalyzed polyolefin having a crystal melting point of 105–145° C. so as to provide further improved resistances to boiling and cooking.

The crystal melting point values referred to herein are based on values measured as a heat-absorption peak temperature by using a DSC (differential scanning calorimeter) (e.g., "DSC-7", available from Perkin-Elmer Corp.).

The metallocene-catalyzed polyolefin constituting the first seal layer can be modified by selective introduction of long-chain branches or can be blended with a polyolefin produced by polymerization using another type of catalyst. Such a polyolefin produced by using another type of catalyst should be used only below 50 wt. % so as to retain the excellent sealability and hot tack of the metallocene-catalyzed polyolefin. The polyolefin prepared by using another type of catalyst may for example be polyethylene, propylene, copolymers of propylene with other α-olefins, LLDPE, VLDPE or ethylene-vinyl acetate copolymer.

The metallocene-catalyzed polyolefin may preferably have a molecular weight dispersion factor defined as a ratio (Mw/Mn) between weight-average molecular weight (Mw) to number-average molecular weight (Mn) of below 3.0, further preferably 1.5–2.8, most preferably 1.9–2.2. The molecular weight dispersion factor may be determined based on the universal calibration method based on GPC (gel permeation chromatography) using polystyrene samples having known molecular weights as calibration standard materials to measure Mw and Mn of a sample metallocene-catalyzed polyolefin from its GPC chromatogram. By using such a metallocene-catalyzed polyolefin containing little oligomer or low-molecular weight polymer faction, it is possible to provide a multilayer film with little stickiness.

The second seal layer according to the present invention may preferably comprise a resin which shows a good adhesiveness to the first seal layer and is provided with improved primary processability, secondary processability and heat-resistance by irradiation with electron rays to provide a package strength (i.e., seal strength) which is not lowered during hot sterilization or cold transportation. The second seal layer may comprise a copolymer of ethylene with at least one oxygen-containing monomer copolymerizable with ethylene having a crystal melting point lower than that of the (principal) metallocene-catalyzed polyolefin in the first seal layer, a mixture of such copolymers or a blend of such a copolymer with another polymer. Examples of the copolymer may include copolymers of ethylene with vinyl acetate, unsaturated acids, such as acrylic acid and methacrylic acid, or $C_1$–$C_4$ alkyl esters of such unsaturated acids, and ionomer resins derived from these copolymers. These copolymers or resins may be used singly or in mixture of two or more species thereof. In the case of a mixture, the copolymer of the largest amount thereof should have a crystal melting point lower than that of the metallocene-catalyzed polyolefin (of the largest amount) in the second seal layer.

The copolymer resin constituting the second seal layer may preferably comprise a copolymer of 80–95 wt. % of ethylene with 20–5 wt. % of at least one monomer selected from vinyl acetate, acrylic acid, methyl acrylate, ethyl acrylate and butyl acrylate, or a blend of these copolymers, in view of the stretchability, heat-resistance and crosslinkability under irradiation with electron rays. The second seal layer can also contain a metallocene-catalyzed polyolefin or another ethylene-α-olefin copolymer within an extent of not hindering the transparency of the resultant film.

The crosslinking by electron ray irradiation of the second seal layer may be performed by irradiating a multilayer film including the second seal layer or irradiating directly the second seal layer before lamination of the other layers. The irradiation of the multilayer film may generally be performed by irradiation through an outermost layer disposed on the side opposite to the first seal layer. In the case of producing the multilayer film by co-extrusion, for example, a molten tubular product (parison) having the first seal layer as the innermost layer is formed by co-extrusion and is, after or without being quenched, flattened to be irradiated with electron rays. The dose may suitably be on the order of 2–20 Mrad (=20–200 kGY) at an acceleration voltage of 150–500 kV. terms of an absorbed dose by the second seal layer.

It is preferred that at least the second seal layer has been crosslinked by irradiation with electron rays or beam. The other layers may be crosslinked or not crosslinked. In case where the multilayer film according to the present invention includes a gas barrier layer as will be described hereinafter and the multilayer film including the gas barrier layer is irradiated with electron rays, if the gas barrier layer comprises a vinylidene chloride copolymer, it is liable to result in an increased yellowish or brownish tint, but the yellowing can be suppressed by adding glycerin aliphatic acid esters, etc.

The second seal layer may preferably have a thickness larger than, preferably ca. 1.5–ca. 2.5 times, that of the first seal layer in view of the fact that the metallocene-catalyzed polyolefin principally constituting the first seal layer has a low melt tension and in order to effectively crosslink the second seal layer. On the other hand, the first seal layer can be thinned down to a thickness of ca. 3 μm. This is advantageous for suppressing the cost of the multilayer film while using a generally expensive metallocene-catalyzed polyolefin. The thickness of the first seal layer may be suppressed below a half of the total multilayer film thickness and preferably at most 20 μm.

By forming a two-layer seal structure taking advantage of the characteristics of metallocene-catalyzed polyolefin, it becomes possible to provide a flexible multilayer film with improved film-forming characteristics, inclusive of primary processabilities, such as extrusion processability, stretch-formability, high-speed bag-making property (sealability) and sealing strength; secondary processabilities, such as deep drawability and skin-packaging characteristic; and other improved packaging film performances, such as heat-shrinkability for preventing the occurrence of meat-juice within or out of food package products, boiling resistance for thermal sterilization and cooking resistance for cooking.

The outermost layer may be disposed on an opposite side of the first seal layer with respect to the second seal layer. It is important for the outermost layer to exhibit an anti-sticking property to a sealing bar used for the sealing so as to be suitably used in an automatic packaging machine or a high-speed bag-making machine including a continuous sealing operation. In the multilayer film according to the present invention, it is preferred that the outermost layer does not contain an ionomer resin, a metallocene-catalyzed polyolefin, or a propylene-ethylene random copolymer of little crystal orientation characteristic in stretching. A flexible multilayer film excellent in continuous sealability may be obtained by using the outermost layer comprising a thermoplastic resin, inclusive of polyester resins, polyamide resins or ethylene-based resins, such as α-olefin resins obtained by using a Ziegler catalyst, linear low-density polyethylene (LLDPE), linear medium-density polyethylene (LMDPE), very low-density polyethylene (VLDPE), and copolymers of ethylene with vinyl acetate, unsaturated acids, such as acrylic acid and methacrylic acid, or alkyl esters of such unsaturated acids.

The multilayer film according to the present invention can include at least one intermediate layer functioning as a gas barrier layer in addition to the first seal layer and the second seal layer. The gas barrier resin may comprise a resin selected from, e.g., vinylidene chloride copolymers, ethylene-vinyl alcohol copolymer, aromatic nylons inclusive of polyamide formed by polycondensation between meth-axylyenediamine and adipic acid, and polyamide formed from terephthalic acid and/or isophthalic acid and hexamethylenediamine, amorphous nylon, semi-crystalline nylon, and acrylonitrile-based copolymers. It is also possible to use a polymer blend, inclusive of: a mixture resin composition comprising principally a vinylidene chloride copolymer, and a copolymer of ethylene with vinyl acetate, an unsaturated acid, such as acrylic acid or methacrylic acid, or an alkyl ester thereof, or an MBS (methyl methacrylate-butadiene-styrene copolymer) resin; a mixture resin composition comprising principally ethylene-vinyl alcohol copolymer having a saponification degree of at least 95 mol. %, and polyester elastomer, polyamide elastomer, ethylene-vinyl acetate copolymer, ethylene-acrylate ester copolymer, or ethylene-vinyl alcohol copolymer having a saponification degree of below 95 mol. %; and a mixture resin composition comprising the above-mentioned aromatic nylon and an aliphatic nylon. It is generally most preferred to use a vinylidene chloride-based copolymer, while ethylene-vinyl alcohol copolymer may be preferred in the case requiring a particularly good flexibility.

Herein, the vinylidene chloride copolymers may include copolymers of vinylidene chloride and at least one mono-ethylenically unsaturated monomer copolymerizable with vinylidene chloride. The mono-ethylenically unsaturated monomer may be used in a proportion of 2–40 wt. %, preferably 4–35 wt. %, of the resultant vinylidene fluoride copolymer. Examples of the mono-ethylenically unsaturated monomer may include vinyl chloride, vinyl acetate, vinyl propionate, alkyl acrylates, alkyl methacrylates, acrylic acid, methacrylic acid, itaconic acid, acrylonitrile, acrylamide, vinyl alkyl ethers, vinyl alkyl ketones, acrolein, allyl esters and ethers, butadiene, and chloroprene. The vinylidene chloride copolymer can also be a ternary or quarternary copolymer. It is particularly preferred to use a copolymer with vinyl chloride or a $C_1$–$C_8$ alkyl (meth)acrylate, such as methyl acrylate, ethyl acrylate or methyl methacrylate.

The gas barrier layer may have a thickness appropriately selected depending on the desired level of gas barrier property of the resultant packaging material. In the case of forming a gas barrier layer comprising a vinylidene chloride copolymer by co-extrusion, the thickness of the layer may preferably be at most 30% of the total film thickness in view of the thermal stability and low-temperature resistance of the multilayer film.

An adhesive layer may be disposed between the respective layers in case where a sufficient adhesion is not ensured between adjacent layers. The adhesive resin may preferably comprise a thermoplastic polymer, copolymer or terpolymer, a modification product of such a thermoplastic resin with an unsaturated carboxylic acid, a modification product of such an acid-modified product further with a metal, or a blend of the above. Specific examples thereof may include: ethylene-vinyl acetate copolymer, ethylene-ethyl acrylate copolymer, olefin copolymers modified with maleic acid, itaconic acid, or an anhydride thereof, a thermoplastic polyurethane elastomer, and a blend of these resins. The adhesive layer may preferably have a thickness of at most 5 μm, more preferably 1–3 μm. It is particularly preferred to suppress the thickness of an adhesive of, e.g., an anhydride-modified resin, such as one modified with maleic anhydride, in view of a weak cohesion and expensiveness of the modified resin.

The multilayer film can further include an additional resin layer comprising, e.g., a polyamide resin or a thermoplastic polyester resin. By including such an additional resin layer, the multilayer film according to the present invention may be provided with further improved bag-making characteristic and heat resistance in combination with the above-mentioned two-layer structure. In order to obtain a flexible multilayer film, it is appropriate to dispose such a layer of polyamide resin or thermoplastic polyester resin as an intermediate layer. On the other hand, if the resin layer is disposed as the outermost layer, the thickness thereof may preferably be suppressed to 0.5–3 μm. If the outermost layer has too large a thickness, the layer is liable to be pealed at a boundary with an inner layer, such as a gas barrier layer. In order to provide a satisfactory film-formability in combination, the multilayer film as a whole may preferably have a secant modulus at 2.5% strain in the range of 150–450 MPa even in case where the total film thickness is 30 μm or larger.

The polyamide resin used for the above purpose may be at least one species of aliphatic nylon selected from, e.g., nylon 6, nylon 11, nylon 12, nylon 66, nylon 69, nylon 610, nylon 612, and copolymer nylons including nylon 6-9, nylon 6-10, nylon 6-12, nylon 6-66, nylon 6-69, and nylon 6-66-610; an aromatic nylon, such as one formed from hexamethylenediamine and an aromatic dibasic acid; or a semi-crystalline or amorphous nylon.

Preferred examples of the thermoplastic polyester resin may include those obtained from an acid component comprising an aromatic dibasic acid, such as terephthalic acid or isophthalic acid, and a glycol component comprising an aliphatic glycol, an alicyclic glycol or an aromatic glycol, such as ethylene glycol, diethylene glycol or cyclohexane dimethanol. For the multilayer film according to the present invention, it is preferred to use a co-polyester formed by using two or three species of acid component or/and glycol component.

The polyamide resin or thermoplastic polyester resin can be blended with another resin, such as thermoplastic polyurethane resin, as desired. In the case of co-extrusion with a vinylidene chloride copolymer for a gas barrier layer, the polyamide resin or thermoplastic polyester resin may preferably have a crystal melting point, if any, of at most 200° C.

The respective resin layers of the multilayer film according to the present invention can contain an optional additive, such as a processing aid, a surfactant (for preventing for, for imparting anti-clouding property, slippability, etc.), or an anti-static agent, within an extent of not adversely affecting the purpose of the present invention. Further, for the purpose of providing an improved met-adhesion with food product, such as processed meat, it is possible to apply a corona discharge treatment to the first seal layer side or the opposite side of the multilayer film.

For a recycle purpose, it is possible to incorporate a pulverizate of the multilayer film containing a metallocene-catalyzed polyolefin into the respective component layers of the multilayer film or include an additional layer of the pulverizate in the multilayer film according to the present invention within an extent of not adversely affecting the performances of the multilayer film. The pulverizate may be ordinarily incorporated into an intermediate layer other than the first seal layer and the outermost layer. As the metallocene-catalyzed polyolefin has a low melt tension, the blend thereof with a gas barrier layer resin, such as vinylidene chloride copolymer or ethylene-vinyl alcohol copolymer, may provide an improved fluidity in an extruder or a die mold to facilitate the provision of a uniform film thickness. In the case of blending the pulverizate with the gas barrier layer resin, the blending ratio may be suppressed to at most ca. 10 wt. %, preferably at most ca. 10 wt. %, while depending on the required level of gas barrier property and transparency of the resultant film. Further, the gas barrier layer of, e.g., a vinylidene chloride copolymer can contain a pulverizate of another vinylidene chloride copolymer film or in lamination with another layer of such a pulverizate.

The multilayer film according to the present invention may generally be formed through co-extrusion but can also be formed through extrusion coating or lamination, or a combination of these. The multilayer film according to the present invention can be coated with a vapor-deposited layer of aluminum, silica, etc., or laminated with another film including such a vapor-deposition layer, to form a new type of packaging material.

The multilayer film according to the present invention having a heat-shrinkability through stretch-orientation may for example be prepared by the coextrusion-inflation method or the T-die stretching method to provide a suitable food-packaging material. The shrinkability can vary depending on the usage, but may for example be at least ca. 30% in both longitudinal and transverse directions at, e.g., 70° C. for low-temperature shrinkage for fresh meat packaging; ca. 25–ca. 50%, e.g., at 90–95° C. for hot sterilization for processed meat packaging; or ca. 35–ca. 50%, e.g., at 100° C., for tray packaging. The multilayer film for such usages may preferably have a total thickness of 10–120 μm.

Some typical laminar structures from the first seal layer side to the outermost layer of the multilayer film according to the present invention are as follows.

(1) Surface layer (first seal layer)/second seal layer/gas barrier layer/surface layer, (2) Surface layer (first seal layer)/second seal layer/gas barrier layer/intermediate layer/surface layer, (3) Surface layer (first seal layer)/second seal layer/intermediate layer/surface layer, An adhesive layer may be disposed between any pair of adjacent layers described above.

As described above, in order to have a satisfactory film-formability, the multilayer film according to the present invention may preferably have a secant modulus at 2.5% strain (a tensile secant modulus as measured according to JIS K7127) in the range of 150–450 MPa. In the case of a film having a thickness of 30 μm or larger, the secant modulus may preferably be 150–400 MPa. The good film-formability herein refers to properties of allowing a stable extrudability and a stable stretchability without trouble, thereby providing a film of a uniform thickness. A uniform film thickness leads to a high-speed bag-making performance. The 2.5%-strain secant modulus in the range of 150–450 MPa may readily provide these performances and also mean that the film is not too flexible or too rigid, exhibit good packaging performance on the material to be packed and shows good adaptability to an automatic packaging machine.

The present invention will be described more specifically based on Examples and Comparative Examples hereinbelow.

In Examples and Comparative Examples shown below, the following resins sometimes denoted by their abbreviative symbols were used, including metallocene-catalyzed ethylene-α-olefin copolymers all showing a molecular weight distribution factor of below 3. The melt-index (MI) values (in the unit of "g/10 min.") were obtained at 190° C. under a load of 2.1 kg. Part(s) means "part(s) by weight".

(1) MePE-1: metallocene-catalyzed ethylene-hexene-1 copolymer ("Exact 9017", mfd. by Exxon Co.; crystal melting point (MP)=112° C., MI=3.0, density (d)=0.920 (g/cm$^3$)).

(2) MePE-2: metallocene-catalyzed ethylene-octene-1 copolymer ("Affinity FM1570" (formed by using a constrained geometry catalyst), mfd. by Dow Chemical Co.; MP=108° C., MI=1.0, d=0.915; Mw/Mn=1.9– 2.2).

(3) MePE-3: metallocene-catalyzed ethylene-octene-1 copolymer ("Affinity PL1880" (formed by using a constrained geometry catalyst), MP=100° C., MI=1.0, d=0.902, Mw/Mn=1.9–2.2). (4) MePE-4: metallocene-catalyzed ethylene-butene-1 copolymer ("Exact 3010C", mfd. by Exxon Co.; MP=87° C., MI=3.5, d=0.900).

(5) MePE-5: metallocene-catalyzed ethylene-butene-1 copolymer ("Exact 4011", mfd. by Exxon Co.; MP=78° C., MI=2.2, d=0.885).

(6) EVA-1: ethylene-vinyl acetate copolymer (vinyl acetate (VA) content=6 wt. %, MP=96° C., MI=3.3).

(7) EVA-2: ethylene-vinyl acetate copolymer (VA content=10 wt. %, MP=91° C., MI=1.5).

(8) EVA-3: ethylene-vinyl acetate copolymer (VA content=15 wt. %, MP=84° C., MI=1.5).

(9) EVA-4: ethylene-vinyl acetate copolymer (VA content=15 wt. %, MP=82° C., MI=4.2).

(10) EVA-5: ethylene-vinyl acetate copolymer (VA content=25 wt. %, MP=70° C., MI=2).

(11) M-EVA: carboxylic acid-modified ethylene-vinyl acetate-acrylic acid copolymer.

(12) EEA-1: ethylene-ethyl acrylate copolymer (ethyl acrylate (EA) content=7 wt. %, MP=97° C., MI=1.5).

(13) EEA-2: ethylene-ethyl acrylate copolymer (EA content=15 wt. %, MP=85° C., MI=1.5).

(14) VLDPE: ethylene-butene-1 copolymer (d=0.902, MP=115° C., MI=2.0).

(15) LLDPE: ethylene-4-methylpentene-1 copolymer (d=0.922, MP=120° C., MI=2.1).

(16) PP: propylene-ethylene random copolymer (ethylene content=7 wt. %, MP=137° C.).

(17) IO: ionomer (Na-type; MP=87° C.).

(18) PVDC-1: vinylidene chloride (VDC) copolymer (VDC/vinyl chloride (VC)=82/18 (by weight)) containing 5 wt. parts each of a stabilizer and a plasticizer per 100 wt. parts of the VDC copolymer:

(19) PVDC-2: vinylidene chloride (VDC) copolymer (VDC/VC=88/12 (by weight)) containing 3 wt. parts of ethylene-vinyl acetate copolymer (VA content=28 wt. %) and 5 wt. parts each of a stabilizer and a plasticizer per 100 wt. parts of the VDC copolymer.

(20) EVOH-1: ethylene-vinyl alcohol copolymer (ethylene content=44 mol. %, saponification degree=99%).

(21) EVOH-2: mixture of 100 wt. parts of EVOH-1 and 3 wt. parts of ethylene-vinyl acetate copolymer.

(22) NY-1: nylon 6-66 copolymer (MP=195° C.).

(23) NY-2: nylon 6-12 copolymer (MP=120° C.).

(22) PET-1: polyethylene terephthalate (95 mol. % of terephthalic acid and 5 mol. % of isophthalic acid: MP=237° C.).

(23) PET-2: polyethylene terephthalate (90 mol. % of terephthalic acid and 10 mol. % of isophthalic acid: MP=225° C.).

(26) A-NY: polycondensate of hexamethylenediamine with terephthalic acid and isophthalic acid ("Sealer PA 3426", mfd. by Mitsui Dupont K.K.; d=1.18, no crystal melting point).

EXAMPLES 1–2, COMPARATIVE EXAMPLE 1

Six-layered laminate products each having a layer structure as shown in Table 1-1 appearing hereinafter were produced by co-extrusion so that the first seal layer (1st layer) constituted the innermost layer. Each extruded tubular molten product (parison) was irradiated from the outermost layer thereof with electron rays at a dose of 10 Mrad and an acceleration voltage of 400 kV and, after reheating, subjected to inflation at stretching ratios of 3.2 times in a longitudinal direction and 3 times in a transverse direction to form a multilayer film having individual layer thicknesses sequentially from the 1st layer of 10/20/1/8/1/18 (μm) and a lay flat width of ca. 400 mm. The films of Examples 1–2 showed 2.5%-secant moduli (JIS K7127) of 150–180 MPa in both longitudinal and transverse directions and heat-shrinkabilities of 38–43% (at 70° C.) in both longitudinal and transverse directions as measured with respect to a square sample of 10 cm (length)×10 cm (width) after dipping for 5 sec in a bath of water at the indicated temperature.

During the above-mentioned film formation, each film composition was evaluated with respect to the film-formabilities.

Each type of the resultant multilayer films was then supplied to a bag-making machine (Model "HBM", mfd. by Toyama Sanki K.K.) to form several circularly bottom-sealed bags. The bags were then packed with fresh meat and evaluated with respect to the bag openability for packing, the adhesion between the meat and the film after heat-shrinkage, the leakage at the seal lines, the occurrence of meat-juice, and the rupture of the bag after dropping.

The results of the evaluation are summarized in Table 1-2 according to the evaluation standards shown below the table.

TABLE 1-1

| | Layer structure*1 | | | | | |
|---|---|---|---|---|---|---|
| | 1st | 2nd | 3rd | 4th | 5th | 6th |
| Ex. 1 | MePE-4 | EVA-3 | EVA-4 | PVDC-1 | EVA-4 | EVA-3 95% EVA-2 5% |
| Ex. 2 | MePE-4 60% MePE-5 40% | EVA-3 | EVA-4 | PVDC-1 | EVA-4 | EVA-3 95% EVA-2 5% |
| Comp. Ex. 1 | MePE-4 | EVA-2 | EVA-4 | PVDC-1 | EVA-4 | MePE-4 |

*1:"%" in the table represents wt. % of the component in each layer.

TABLE 1-2

| | Film properties | | |
|---|---|---|---|
| | Ex. 1 | Ex. 2 | Comp.Ex. 1 |
| Extrudability | A | A | B |
| Stretchability | A | A | B⁻ |
| Bag formability (1) | A | A | B |
| Fresh meat packageability | A | A⁻ | B⁻ |

(Extrudability)
A: Easily formed into a parison without entanglement of resin below the extrusion die.
B: Liable to cause entanglement so that the parison formation was somewhat difficult.
(Stretchability (Inflation Stability))
A: Stable inflation was possible without substantial vibration of the shoulder.
B⁻: Inflation was unstable due to a remarkable vibration of the shoulder, so that the sample could be formed in a length of only several hundred meters.
(Bag-formability (1))
Evaluated by using a bag-manufacturing machine for providing a circular bottom-sealed bags ("Model HBM", available from Toyama Sanki K.K.).
A: A good bag-making rate of 70 bags/min.
B: Liable to cause sticking of the film onto the seal bar, thus resulting in a smaller seal thickness. The bag-making rate was 30 bags/min.

(Fresh Meat Packaging Performance)
A: The film closely fitted to the fresh meat (ca. 8 kg) at a heat-shrinkage temperature of 77° C., and the resultant packed bag did not cause a rupture at the seal line by dropping from a height of 1 m.
A⁻: Exhibited a good heat-shrinkability at 77° C. and a good result at the 1 m-dropping test. The bag openability for packaging was not so good. Good adhesion was exhibited between films, and no noticeable dripping was observed.
B⁻: The bags were ruptured at a rate of one from three at the 1 m-dropping test.

EXAMPLES 3–5, COMPARATIVE EXAMPLES 2–3

Six-layered laminate products each having a layer structure as shown in Table 2-1 were produced by co-extrusion so that the first seal layer (1st layer) constituted the innermost layer. Each extruded parison was irradiated from the outermost layer side with electron rays at a dose of 12 Mrad and an acceleration voltage of 300 kV and, after reheating, subjected to inflation at stretching ratio of 2.8 times in a longitudinal direction and 2.5 times in a transverse direction to form a multilayer film having individual layer thicknesses sequentially from the 1st layer of 12/18/1/8/1/14 (μm) and a lay flat width of ca. 400 mm. The films of Examples 3–5 showed 2.5%-secant moduli of 200–220 MPa in both longitudinal and transverse directions and heat-shrinkabilities (at 90° C.) of 45–50% in both longitudinal and transverse directions. The multilayer film of Comparative Example 2 was poor in gloss.

Each type of the multilayer films was then supplied to a bag-making machine ("Model DSWH", available from Taiyo Shokai K.K.) to form several side-sealed bags. The bags were then packed with processed meat, subjected to 10 min. of hot sterilization at 95° C., and then evaluated with respect to the adhesion between the meat and bag, the rupture at the seal line and the occurrence of dripping. The results are summarized in Table 2-2.

TABLE 2-1

| | 1st | 2nd | 3rd | 4th | 5th | 6th |
|---|---|---|---|---|---|---|
| Ex. 3 | MePE-2 99% MePE-3 10% | EVA-2 80% EVA-3 20% | EEA-2 | PVDC-1 | EEA-2 | VLDPE |
| Ex. 4 | MePE-1 25% MePE-3 75% | EVA-2 | EVA-4 | PVDC-1 | EVA-4 | EVA-1 80% LLDPE 20% |
| Ex. 5 | MePE-2 50% MePE-4 10% VLDPE 40% | EEA-1 | EEA-2 | PVDC-1 | EEA-2 | VLDPE |
| Comp. Ex.2 | MePE-1 30% MePE-4 70% | MePE-4 | EVA-4 | PVDC-2 | EVA-4 | MePE-4 |
| Comp. Ex.3 | EVA-1 | MePE-3 | EVA-4 | PVDC-1 | EVA-4 | VLDPE |

TABLE 2-2

|  | Ex.3 | Ex.4 | Ex.5 | Comp. Ex.2 | Comp. Ex.3 |
|---|---|---|---|---|---|
| Extrudability | A | A | A | B⁻ | A |
| Stretchability | A | A | A | B⁻ | B⁻ |
| Bag formability (2) | A | A | A | C | B⁻ |
| Processed meat packageability | A | A | A | — | C |

(Extrudability)
 Same as in Table 1-1
 B⁻: Liable to cause entanglement of the resin below the extrusion die so that the parison formation was very difficult.
(Stretchability)
 Same as in Table 1-1.

(Bag-formability (2))
 Evaluated by using a bag-manufacturing machine for providing side-sealed bags ("model DSWH", mfd. by Taiyo Shokai K.K.).
 A: A good bag-making rate of 80 bags/min.
 B⁻: Some bags caused a melt-cutting at the seal line because of film thickness irregularity (caused by instability of inflation bubble shoulder). The bag-making rate was 30 bags/min.
 C: Generally caused a melt-sticking at the seal line because of the film thickness irregularity (caused by instability of inflation bubble shoulder) and the sticking onto the seal bar.
(Processed meat packageability)
 A: Good cling at a hot-sterilization temperature of 95° C. No dripping (meat-juice) was noticed. Exhibited good boiling resistance causing no breakage at the seal line.
 C: Caused a breakage of bag from the seal line at a hot sterilization temperature of 95° C.
 –: Not measured.

EXAMPLES 6–7, COMPARATIVE EXAMPLES 4–5

Eight-layered laminate products each having a layer structure as shown in Table 3-1 were produced by co-extrusion so that the first seal layer (1st layer) constituted the innermost layer. Each extruded parison was irradiated from the outermost layer side with electron rays at a dose of 8 Mrad and an acceleration voltage of 350 kV and, after reheating, subjected to inflation at stretching ratios of 3.2 times in a longitudinal direction and 3.0 times in a transverse direction to form a multilayer film having a lay flat width of ca. 350 mm and having individual layer thicknesses sequentially from the 1st layer of 8/20/2/10/2/10/2/4 (μm) (Examples 6, 7 and Comparative Example 4) and 18/10/2/10/2/10/2/4 (μm) (Comparative Example 5). The films of Examples 6–7 showed 2.5 %-secant moduli of 220–240 MPa in both longitudinal and transverse directions and heat-shrinkabilities (at 85° C.) of 40–45% in both longitudinal and transverse directions. The multilayer film of Example 7 showed a slightly pearl-like appearance.

Each type of the multilayer films was then supplied to a bag-making machine ("Model HBM", available from Toyama Sanki K.K.) to form several circular bottom-sealed bags similarly as in Example 1. The bags were then packed with pork meat, and evaluated with respect to the bag openability for packing, the adhesion between the meat and the film after heat-shrinkage, the leakage from the seal lines, the occurrence of dripping, and the rupture of the bag after dropping.

The results are summarized in Table 3-2.

TABLE 3-1[*1]

|  | 1st | 3rd | 4th | 5th | 6th | 7th | 8th |
|---|---|---|---|---|---|---|---|
| Ex. 6 | MePE-3 | M-EVA | PVDC-2[*2] | M-EVA | NY-2 | M-EVA | EVA-1 |
| Ex. 7 | MePE-3 | EVA-4 | PVDC-2[*3] | EVA-4 | IO | EVA-4 | VLDPE |
| Comp. Ex. 4 | VLDPE | M-EVA | PVDC-2 | M-EVA | NY-2 | M-EVA | VLDPE |
| Comp. Ex. 5[*4] | MePE-3 | M-EVA | PVDC-2 | M-EVA | NY-2 | M-EVA | VLDPE |

[*1]: The second layer in each Example comprised EVA-2.
[*2]: PVDC-2 (for Ex. 6) contained 30 wt. % of pulverizate of a single layer film of PVDC-2.
[*3]: PVDC-3 (for Ex. 7) contained 5 wt. % of pulverizate of the parison of Example 7.
[*4]: The multilayer film of Comparative Example 5 had successive layer thicknesses of 18/10/2/10/2/10/2/4 (μm).

TABLE 3-2

|  | Ex.6 | Ex.7 | Comp.Ex.4 | Comp.Ex.5 |
|---|---|---|---|---|
| Extrudability | A | A | A | B⁻ |
| Stretchability | A | A | A | B⁻ |
| Bag formability (1) | A | A | B | B⁻ |
| Pork meat packageability | A | A | C | — |

(Extrudability)
 Same as in Table 1-1
 B⁻: Liable to cause entanglement of the resin below the extrusion die so that the parison formation was very difficult.
(Stretchability)
 Same as in Table 1-1.
 B⁻: Inflation was unstable because of remarkable vertical vibration of the shoulder, so that the sample could be formed in a length of only several hundred meters. No improvement was given by increasing the heating temperature for stretching.
(Bag-formability (1))
 Similarly as in Table 1-2.
 A: A good bag-making rate of 80 bags/min.
 B⁻: To facilitate the bag opening, air was blow thereinto, but the seal line was liable to be wrinkled. The bag-making rate was 30 bags/min.
(Pork meat packageability)
 A: The film closely fitted to the pork meat (ca. 6 kg) at a heat shrinkage temperature of 90° C., and the resultant packaged bag did not cause a rupture by dropping from a height of 1 m.
 C: The bag openability for packing was not good. Some leakage was observed at the wrinkled seal line by checking with a red alcohol-containing penetrating liquid.

EXAMPLE 8, COMPARATIVE EXAMPLE 6

Seven-layered laminate products each having a layer structure as shown in Table 4-1 were produced by co-extrusion so that the first seal layer (1st layer) constituted the innermost layer. Each extruded parison was irradiated from the outermost layer side (7th layer) with electron rays at a dose of 4 Mrad and an accelerating voltage of 200 kV and, after reheating, subjected to inflation at stretching ratio of 2.6 times in a longitudinal direction and 2.5 times in a transverse direction to form a multilayer film having individual layer thicknesses sequentially from the 1st layer of 10/11/1.5/5/11/1.5/4 (μm) and a lay flat width of ca. 450 m. The films of Example 8 and Comparative Example 6 showed 2.5%-secant moduli of 370–390 MPa in both longitudinal and transverse directions and heat-shrinkabilities (at 90° C.) of 40–45% in both longitudinal and transverse directions.

Each type of the multilayer films was supplied to a pillow-packaging machine ("NW Pillow-Packaging Machine", mfd. by Ohmori Kikai K.K.) to form three-side-sealed processed meat packages. The resultant processed meat packages were subjected to 10 min. of hot-sterilization at 95° C. and evaluated with respect to the adhesion between the meat and film, the rupture at the seal line and the occurrence of meat-juice. The results are summarized in Table 4-2.

(Packageability (or sealability))

A: A good packaging rate of 18 m/min.

C: The multilayer film stuck to a rotating rear seal bar so that the packaging was interrupted several times. The seal part thickness was also reduced. An increased amount of starch powder was applied in order to prevent film blocking, so that the refuse thereof attached to the seal line, thus failing to provide a fine seal line.

(Processed meat packageability)

A: Exhibit a good boiling resistance such that the packaged processed meat (of ca. 200 g) did not cause a rupture at the seal line even after hot sterilization at 95° C. The film showed a good adhesion, and no meat-juice was noticed.

C: Leakage was observed at the three-side seal line after hot sterilization at 95° C. as a result of checking with a red alcohol-containing penetrating liquid.

EXAMPLES 9–10

Seven- or six-layered laminate products each having a layer structure as shown in Table 5-1 were produced by co-extrusion so that the first seal layer (1st layer) constituted the innermost layer. Each extruded parison was, after reheating, subjected to inflation at stretching ratio of 3 times in a longitudinal direction and 3 times in a transverse direction and then longitudinally slit into two sheets of multilayer film each having a width of ca. 390 mm and individual layer thicknesses sequentially from the first layer of 3/7/1/2.5/4.5/1/1 (μm) (Example 9) and 4/9/1/4/1 (μm)

TABLE 4-1

|  | 1st | 2nd | 3rd | 4th | 5th | 6th | 7th |
|---|---|---|---|---|---|---|---|
| Ex.8 | MePE-2 90% MePE-3 10% | EVA-2 | M-EVA | EVOH-1 | NY-1 70% NY-2 30% | M-EVA | EVA-1 |
| Comp. Ex.6 | VLDPE | EVA-2 | M-EVA | EVOH-2 | NY-1 70% NY-2 30% | M-EVA | PP |

TABLE 4-2

|  | Ex. 8 | Comp.Ex.6 |
|---|---|---|
| Extrudability | A | A |
| Stretchability | A | A |
| Packageability | A | C |
| Processed meat packageability | A | C |

(Extrudability), (Stretchability)

Same as in Table 1-2.

(Example 10). The films of Examples 9–10 showed 2.5%-secant moduli of 40–45 MPa in both longitudinal and transverse directions and heat-shrinkabilities (at 100° C.) of 43–47% in both longitudinal and transverse directions.

Each multilayer-film was supplied to a packaging machine ("Model FW, mfd. by Fuji Kikai K.K.) to form three side-sealed packages each containing a sliced ham-loaded tray. The packages were then passed through an oven at a temperature of 110° C. and thereafter observed with respect to the film adhesion state and the occurrence of leakage at the seal line. The results are shown in Table 5-2.

TABLE 5-1

|  | 1st | 2nd | 3rd | 4th | 5th | 6th | 7th |
|---|---|---|---|---|---|---|---|
| Ex. 9 | MePE-2 90% MePE-3 10% | EVA-2 | M-EVA | EVOH-1 | NY-1 80% A-NY 20% | M-EVA | PET-2 |
| Ex. 10 | MePE-2 90% MePE-3 10% | EVA-2 | M-EVA | NY-1 60% NY-2 40% | M-EVA | PET-2 | |

TABLE 5-2

|  | Ex. 9 | Ex. 10 |
|---|---|---|
| Extrudability | A | A |
| Stretchability | A | A |
| Packageability | A | A |
| Tray packageability | A | A |

(Extrudability) (Stretchability)
  Same as in Table 1-2.
(Packageability—Sealability)
  A: A good packaging rate of 80 packages/min.
(Tray packageability)
  A: The packaging film tightly fitted onto the sliced ham on the tray after passing through the oven at 110° C. No leakage was observed as a result of checking with a red alcohol-containing penetrating liquid.

EXAMPLES 11–12, COMPARATIVE EXAMPLE 7

Four- or six-layered laminate products each having a layer structure as shown in Table 6-1 were produced by co-extrusion so that the first seal layer (1st layer) constituted the innermost layer. Each parison immediately after passing through the extrusion die was subjected to inflation and then slit into two sheets of multilayer film each having a width of ca. 405 mm and individual layer thicknesses sequentially from the 1st layer of 15/30/2/2 ($\mu$m) (Example 11), 12/30/1/5/1/1 ($\mu$m) (Example 12) and 15/30/2/2 ($\mu$m) (Comparative Example 7). The films of Examples 11–12 showed 2.5%-secant moduli of 300–350 MPa in both longitudinal and transverse directions and no heat-shrinkability in any of longitudinal and transverse directions as measured at 90° C. for 5 sec.

Each multilayer film was supplied to a pillow-packaging machine ("NW Pillow-Packaging Machine", mfd. by Ohmori Kikai K.K.) to form three-side-sealed processed meat packages. The resultant processed meat packages were subjected to 10 min. of hot sterilization at 95° C. and evaluated with respect to the cling between the meat and film, the rupture at the seal line and the occurrence of meat-juice. The results are summarized in Table 6-2.

TABLE 6-1

|  | 1st | 2nd | 3rd | 4th | 5th | 6th |
|---|---|---|---|---|---|---|
| Ex.11 | MePE-1 90% MePE-4 10% | EVA-2 | M-EVA | PET-1 | | |
| Ex.12 | MePE-1 90% MePE-4 10% | EVA-2 | M-EVA | EVOH-1 | M-EVA | PET-2 |
| Comp. Ex. 7 | MePE-1 | MePE-4 | M-EVA | PET-1 | | |

TABLE 6-2

|  | Ex. 11 | Ex. 12 | Comp.Ex.7 |
|---|---|---|---|
| Extrudability | A | A | C |
| Stretchability | A | A | C |
| Packageability | A | A | — |
| Processed meat packageability | A | A | — |

(Extrudability)
  Same as in Table 1-2.
  C: The parison formation was impossible because of entanglement below the extrusion die.
(Stretchability)
  A: The inflation was performed with stable shoulder formation by using a cooling mantle.
  C: The shoulder could not be formed.
(Packageability (or sealability))
  A: A good packaging rate of 18 m/min.
(Processed meat packageability)
  Same as in Table 4-2.

As is understood from the above-mentioned Examples and Comparative Examples, the multilayer film having the two-layer seal structure including the specified first seal layer and second seal layer according to the present invention has provided an improvement to the film formability which has been a weak point of metallocene-catalyzed polyolefin and provided improved properties including primary processabilities, such as extrudability, stretchability, high-speed bag-formability (sealability), and strength; secondary processabilities, such as deep drawing characteristic and skin packaging characteristic; and further heat-shrinkability for preventing the occurrence of meat-juice within or out of food packages, boiling resistance desirable for hot sterilization and cooking resistance desirable for cooking.

What is claimed is:

1. A multilayer film, comprising at least three layers including a first seal layer as a surface layer, a second seal layer and a third layer of a thermoplastic resin, said second seal layer being between said first seal layer and said third layer, and said second seal layer directly contacting said first seal layer;
  said first seal layer comprising more than 50 wt. % of a metallocene-catalyzed polyolefin;
  said second seal layer having a thickness larger than that of the first seal layer and comprising a copolymer of at least one oxygen-containing monomer and unsubstituted ethylene;
  provided that said copolymer of the second seal layer has a crystal melting point lower than that of the metallocene-catalyzed polyolefin of the first seal layer.

2. The multilayer film according to claim 1, wherein the first seal layer comprises a mixture of at least 50 wt. % of the metallocene-catalyzed polyolefin and another metallocene-catalyzed polyolefin, and the second seal layer comprises a mixture of a largest amount of the copolymer and a smaller amount of another resin.

3. The multilayer film according to claim 1, having a secant modulus at 2.5% strain of 150–450 MPa.

4. The multilayer film according to claim 1, wherein the second seal layer has been crosslinked by irradiation with electron rays.

5. The multilayer film according to claim 1, wherein said metallocene-catalyzed polyolefin is an ethylene-based resin.

6. The multilayer film according to claim 1, wherein said metallocene-catalyzed polyolefin has a weight-average molecular weight (Mw)/number-average molecular weight (Mn) ratio below 3.

7. The multilayer film according to claim 1, wherein said metallocene-catalyzed polyolefin is a mixture of a metallocene-catalyzed polyolefin having a crystal melting point of 105–145° C. and a metallocene-catalyzed polyolefin having a crystal melting point of 70° C. (inclusive) to 105° C. (not inclusive).

8. The multilayer film according to claim 1, wherein said second seal layer comprises a copolymer of 80–95 wt. % of ethylene and up to 20 wt. % of at least one monomer selected from the group consisting of vinyl acetate, acrylic acid, methyl acrylate, ethyl acrylate and butyl acrylate.

9. The multilayer film according to claim 1, further including a gas barrier layer.

10. The multilayer film according to claim 1, having a heat-shrinkability.

11. The multilayer film according to claim 1, being a co-extruded film.

12. The multilayer film according to claim 1, wherein said outermost third layer comprises a thermoplastic resin free from a metallocene-catalyzed polyolefin.

* * * * *